(12) United States Patent
Raichle et al.

(10) Patent No.: US 9,490,727 B2
(45) Date of Patent: Nov. 8, 2016

(54) METHOD FOR CALIBRATING A MULTIPHASE INVERTER, OPERATING APPARATUS, COMPUTER PROGRAM, AND COMPUTER PROGRAM PRODUCT

(75) Inventors: Daniel Raichle, Vaihingen (DE); Mark Damson, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 14/357,586

(22) PCT Filed: Sep. 13, 2012

(86) PCT No.: PCT/EP2012/067960
§ 371 (c)(1),
(2), (4) Date: Jul. 9, 2014

(87) PCT Pub. No.: WO2013/068156
PCT Pub. Date: May 16, 2013

(65) Prior Publication Data
US 2014/0340017 A1  Nov. 20, 2014

(30) Foreign Application Priority Data
Nov. 11, 2011 (DE) .................. 10 2011 086 177

(51) Int. Cl.
*H02P 27/06* (2006.01)
*H02M 7/5387* (2007.01)
*H02M 1/00* (2006.01)

(52) U.S. Cl.
CPC .......... *H02M 7/53871* (2013.01); *H02P 27/06* (2013.01); *H02M 2001/0009* (2013.01)

(58) Field of Classification Search
CPC .... H02M 7/53871; H02P 27/06; H02P 27/04
USPC ........................ 318/490; 363/95–98
See application file for complete search history.

(56) References Cited

U.S. PATENT DOCUMENTS

| 6,148,052 A * | 11/2000 | Bogdan | G01R 25/00 327/159 |
|---|---|---|---|
| 6,172,509 B1 | 1/2001 | Cash et al. | |
| 6,339,538 B1 * | 1/2002 | Handleman | G05F 1/67 136/293 |
| 7,986,121 B2 * | 7/2011 | Hayashi | H02P 21/0042 318/434 |

FOREIGN PATENT DOCUMENTS

CN    101295937    * 10/2008

OTHER PUBLICATIONS

International Search Report for Application No. PCT/EP2012/067960 dated Jul. 5, 2013 (English Translation, 2 pages).

* cited by examiner

*Primary Examiner* — Bentsu Ro
(74) *Attorney, Agent, or Firm* — Michael Best & Friedrich LLP

(57) ABSTRACT

The invention relates to a method for calibrating a multiphase, in particular three-phase, inverter (1) having a respective switching element ($T_1$, $T_2$, $T_3$) on the high-voltage side and a respective switching element ($T_4$, $T_5$, $T_6$) on the low-voltage side for each of the phases thereof as well as a respective current sensor for at least some of the phases (I, II, III). The following steps are proposed: (f) switching off all switching elements ($T_1$-$T_6$), (g) switching on a switching element ($T_1$) on the high-voltage side for a first phase (I) and a switching element ($T_5$) on the low-voltage side for a second phase (II), (h) measuring the currents flowing through the first phase (I) and the second phase (II), (i) forming an average value from the measured currents, and (j) calibrating the inverter (1) on the basis of the formed average value. The invention also relates to an apparatus, a computer program and a computer program product.

10 Claims, 1 Drawing Sheet

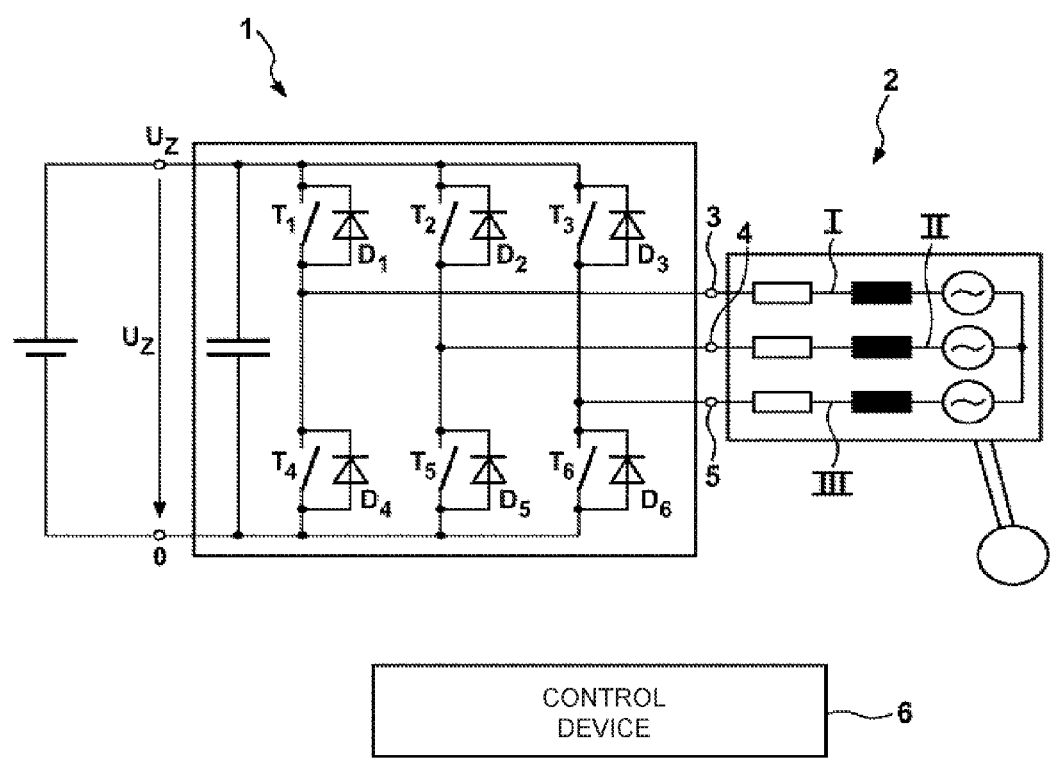

METHOD FOR CALIBRATING A MULTIPHASE INVERTER, OPERATING APPARATUS, COMPUTER PROGRAM, AND COMPUTER PROGRAM PRODUCT

BACKGROUND OF THE INVENTION

The invention relates to a method for calibrating a multiphase, in particular three-phase inverter, in particular a pulse-controlled inverter, which has, for each of its phases, in each case one switching element on the high-voltage side and in each case one switching element on the low-voltage side and, for at least two of the phases, in each case one current sensor.

In addition, the invention relates to an apparatus for operating such an inverter, and to a computer program and to a computer program product.

For actuating electric machines, in particular for actuating polyphase machines, inverters are provided which supply current to three in particular star-connected or delta-connected phases of the electric machine. Generally, such inverters have, for each of the phases, a switching element on the high-voltage side and a switching element on the low-voltage side, which switching elements are switchable independently of one another and form a bridge circuit for actuating the electric machine. Typically, a current sensor is assigned to at least two of the phases and is connected downstream of the inverter in order to detect the current provided by the inverter. Errors in the measured currents result firstly in errors in the calculated torques of the electric machine and secondly also in torque oscillations which have a negative effect on a drive response of the electric machine. In order to improve the accuracy of the current detection, often calibration of the inverter or of the current sensor system thereof is implemented, wherein offset errors of the current sensor system are generally detected in the deenergized state, i.e. when all of the switching elements of the inverter are open and the electric machine is not rotating. In this case, the current is measured and then the measured value is used to compensate for an offset of the current sensor system.

SUMMARY OF THE INVENTION

The method according to the invention has the advantage that amplification errors in the current measurement can be reduced to a mean value and in particular the differences in the amplification errors which can have a negative effect for current regulation are compensated for. For this purpose, the invention provides that (a) first all of the switching elements of the inverter are switched off or deactivated, (b) then a switching element on the high-voltage side of a first phase and a switching element on the low-voltage side of a second phase are switched on, (c) the currents flowing through the first phase and the second phase are each measured by means of corresponding current sensors, (d) a mean value is generated from the measured currents, and (e) the inverter and in particular its current sensor system are calibrated depending on the mean value thus generated. By virtue of all of the switching elements being switched off, first all of the phases are deactivated, with the result that a current should not be flowing in any phase. Then, in the case of two phases, in each case one switching element, namely a switching element on the high-voltage side for one phase and a switching element on the low-voltage side for another phase, is activated, with the result that the at least one further, third phase remains deenergized. The currents measured in the phases in which the respective switching element has been activated are used to generate a mean value and the inverter is calibrated depending on this mean value. In particular, as has already been mentioned, amplification errors are thus reduced. Furthermore, it is ensured that the remaining amplification error is the same for all current sensors, for which purpose the method is preferably repeated for the remaining current sensors and phases.

Preferably, it is assumed for the calibration that the absolute value of a real current of the inverter, in particular the real current of the measured phases, corresponds to the generated mean value of the absolute values of the measured currents.

Furthermore, preferably, prior to step (b), a check is first performed to ascertain whether the current in all phases is equal to zero. If this is not the case, there is a wait time until the desired state is reached. This takes place in particular in the case of inverters with only two phases.

In accordance with an alternative embodiment, in particular in the case of inverters with three or more phases, it is preferably provided that, prior to step (b), a check is first performed to ascertain whether the current in at least that phase which is not energized or is not intended to be energized in step (b) is equal to zero. This ensures that, on subsequent energization of two phases or winding phases, there is no current flowing through the third phase or the third winding phase.

An advantageous development of the invention provides that the method is repeated until all possible mean values of the inverter have been detected or all possible combinations of switching element switch-on operations in accordance with step (b) have been implemented. Thus, the differences in the amplification errors which can have a particularly negative effect on the regulation can be compensated for overall.

Particularly preferably, the respective switching elements are only actuated for a short period of time in such a way that an electric machine actuated by the inverter does not generate any torque. This ensures that, when implementing the calibration, the electric machine does not generate any torque which could act, for example, as drive torque on driving wheels of a motor vehicle if the electric machine is intended as a drive unit of a vehicle or motor vehicle. Alternatively, during the calibration, a signal can also be output which has the effect that a clutch located between the electric machine and a drivetrain is opened, with the result that a rotation of the electric machine has no effect on the surrounding environment, in particular the drive system.

The apparatus according to the invention for implementing the method has a specially designed control device which contains means for implementing the method. Preferably, the control device has an electrical memory, in which the method steps are stored as control device program.

The computer program according to the invention provides for all of the steps of the method according to the invention to be implemented when it is running on a computer.

The computer program product according to the invention comprising a program code stored on a machine-readable storage medium implements the method according to the invention when the program is run on a computer.

BRIEF DESCRIPTION OF THE DRAWING

The invention will be explained in more detail below with reference to the drawings, in which the single FIGURE shows a three-phase inverter for actuating a polyphase machine.

DETAILED DESCRIPTION

The FIGURE shows, in a schematic illustration, an inverter 1, which is connected to a polyphase machine 2 for the operation thereof. The polyphase machine 2, which is in the form of an asynchronous machine, for example, has three winding phases or phases I, II and III. The phases I, II and III are star-connected to one another, for example. The inverter 1 has a bridge circuit for actuating the phases I, II and III. Said bridge circuit has a switching element $T_1$ on the high-voltage side and a switching element $T_4$ on the low-voltage side for phase I. In this case, a freewheeling diode $D_1$ is assigned to the switching element $T_1$ on the high-voltage side and a freewheeling diode $D_4$ is assigned to the switching element $T_1$, in each case in parallel. Furthermore the bridge circuit has a switching element $T_2$ on the high-voltage side and a switching element $T_5$ on the low-voltage side for phase II. In this case, a freewheeling diode $D_2$ is assigned to the switching element $T_2$ and a freewheeling diode $D_5$ is assigned to the switching element $T_5$, in each case in parallel. There is corresponding driving of the phase III. A switching element $T_3$ on the high-voltage side and a freewheeling diode $D_3$ connected in parallel therewith and a switching element $T_6$ on the low-voltage side and a freewheeling diode $D_6$ connected in parallel therewith are assigned to said phase. The design of the inverter 1 is known in principle, and therefore no further details in this regard will be given.

Furthermore, a current sensor 3, 4 and 5 is assigned to each phase I, II and III, which current sensor detects the current flowing through the respective winding phase or through the respective phase I, II and III. The detected values are fed to a control device 6, wherein the control device 6 actuates the switching elements $T_1$ to $T_6$ in order to operate the electric machine or polyphase machine 2.

Ideally, the relationship between a calculated current I and a measured current value x of an analog-to-digital converter which acts as current sensor is as follows: $I(x)=bx$, where b represents an amplification.

In reality, this relationship is also falsified by offset errors, amplification errors and nonlinearities of the current sensor system, i.e. in particular the current sensors 3, 4 and 5, with the result that the calculated current I is determined as follows: $I(x)=a+b_{real}x+cx^2dx^3$, where x is the digital value of the analog-to-digital converter, a is an offset (error), $b_{real}$ denotes the real amplification, which does not correspond to the theoretical amplification b, and c and d denote nonlinearities of the sensor system. If the nonlinearity is not taken into consideration, the following then applies: $c=d=0$. Naturally, however, it is also conceivable for even more nonlinearities to be taken into consideration.

By virtue of the method described below, advantageous calibration of the inverter 1 is performed, which is used in particular for correcting amplification errors. For this purpose, a check is first carried out to ascertain whether the current in all three phases I, II and III is equal to zero. For this purpose, first all of the switching elements $T_1$-$T_6$ are opened or deactivated. If a current continues to flow in one of the phases I, II and III, there is a wait time until the current is equal to zero in this phase too.

Then, in the present exemplary embodiment, in each case one switch $T_1$ on the high-voltage side of a phase and one switching element $T_5$ on the low-voltage side of another phase III are switched on, while the other four switches $T_2$, $T_3$, $T_4$ and $T_6$ remain switched off or deactivated. As a result, the same current needs to flow (in different directions) via two of the current sensors 3 and 4. For the correction, it is now assumed that the absolute value of the real current corresponds to the mean value of the absolute values of the two measured currents.

Thus, firstly the amplification error can be reduced to the mean value of the amplification errors of the individual sensors 3, 4. In addition, the differences in the amplification errors which have a particularly negative effect for the regulation can be compensated for. That is to say that it is possible for the amplification to be corrected in a simple manner. However, with further measurements, even the correction of the nonlinearity would be possible, in which case at least one further measurement at a different current level is preferably implemented for each further coefficient. Only the correction of the amplification will be described below by way of example.

With reference to the abovementioned example, the currents $I_1$ and $I_2$ of the phases I and II are measured by means of the sensors 3 and 4, where $I_1=-100$ A and $I_2=110$ A. The following correction factors $m_{1poscorr}$ and $m_{2negcorr}$ result from this:

$$m_{1poscorr}=(I_1-I_2)/(2 \cdot I_1) \approx 1.05 \text{ and}$$

$$m_{2negcorr}=(I_2-I_1)/(2 \cdot I_2) \approx 0.95$$

Then, the switching elements $T_2$ and $T_4$ are closed, while the remaining four switching elements $T_1$, $T_5$, $T_3$ and $T_6$ are opened or remain open. In this case, the following result as measured currents: $I_1=-96$ A and $I_2=100$ A, which results in the following correction values:

$$m_{1negcorr}=(I_1-I_2)/(2 \cdot I_1) \approx 1.03 \text{ and}$$

$$m_{2poscorr}=(I_1-I_1)/(2 \cdot I_2) \approx 0.97$$

It is now possible, for example, for either an averaged correction factor to be determined:

$$m_{1corr}=(m_{1poscorr}+m_{1negcorr})/2$$

$$m_{2corr}=(m_{2poscorr}+m_{2negcorr})/2$$

or for the respective transmission characteristic to comprise two straight lines.

$$I=a+m_{1poscorr} \cdot b \cdot x \text{ for } x \geq 0$$

$$I=a+m_{1negcorr} \cdot b \cdot x \text{ for } x<0$$

While the above-described method can be implemented using only two current sensors 3, 4, when using three current sensors 3, 4 and 5 each sensor 3, 4 and 5 can always be compared with the two other sensors 3, 4 and 5. This results in the following scheme, for example:

| Closed switching elements | Measured currents |
| --- | --- |
| $T_1$, $T_5$ | $I_{1A}$, $-I_{2A}$ |
| $T_1$, $T_6$ | $I_{2B}$, $-I_{3B}$ |
| $T_2$, $T_4$ | $I_{2C}$, $-I_{1C}$ |
| $T_2$, $T_6$ | $I_{2D}$, $-I_{3D}$ |
| $T_3$, $T_4$ | $I_{3E}$, $-I_{1E}$ |
| $T_3$, $T_5$ | $I_{3F}$, $-I_{2F}$ |

The first index for the measured currents represents the respective current sensor or the respective phase I, II or III, and the second index represents the respective measurement. Thus, for example, the correction factor $m_{1poscorr}$ can be calculated as follows:

$$m_{1poscorr} = \frac{1}{4} \cdot \left( \frac{I_{1A} - I_{2A}}{I_{1A}} + \frac{I_{1B} - I_{3B}}{I_{1B}} \right)$$

The calculation for the other correction factors is performed correspondingly. The possibility of determining either the positive or the negative correction factors for a mean correction factor or of dividing the characteristics into two subregions with a different gradient is likewise provided, as in the case of two sensors.

By virtue of energization, a torque of the polyphase machine 2 is generally also generated. Therefore, provision is made for either a clutch between the polyphase machine 2 and a following drivetrain to be open such that a rotation of the polyphase machine 2 does not have any effects on the drivetrain or for the current pulses to be selected to be short, by corresponding actuation of the switching elements $T_1$ to $T_6$ by the control device 6, such that, as a result, the applied torque does not have any effects, in particular any undesired acceleration, on the entire system, in particular a vehicle comprising the polyphase machine 2.

The invention claimed is:

1. A method for determining one or more correction factors for current sensors (3, 4, 5) of a multiphase inverter (1), which has, for each of its phases (I, II, III), in each case one switching element ($T_1$, $T_2$, $T_3$) on the high-voltage side and in each case one switching element ($T_4$, $T_5$, $T_6$) on the low-voltage side and, for at least some of the phases, in each case one current sensor (3, 4, 5) assigned to one of the phases (I, II, III) and detecting current flowing through a respective winding phase or through a respective phase (I, II, III), the method comprising:
   (a) switching off all of the switching elements ($T_1$-$T_6$),
   (b) switching on a switching element ($T_1$) on the high-voltage side of a first phase (I) and a switching element ($T_5$) on the low-voltage side of a second phase (II),
   (c) measuring, by two of the current sensors (3, 4), the currents flowing through the first phase (I) and the second phase (II),
   (d) generating a mean value from the currents measured by the two current sensors (3, 4), and
   (e) generating at least one correction factor based on the generated mean value, the at least one correction factor used for operating the multiphase inverter (1).

2. The method as claimed in claim 1, characterized in that for the determining one or more correction factors the absolute value of a real current of the inverter (1) is used to generate the mean value of the measured currents.

3. The method as claimed in claim 1, characterized in that, prior to step (b), a check is initially performed to ascertain whether the current in all phases is equal to zero.

4. The method as claimed in claim 1, characterized in that, prior to step (b), a check is initially performed to ascertain whether the current in at least that phase which is not energized in step (b) is equal to zero.

5. The method as claimed in claim 1, characterized in that the method is repeated until all possible mean values of the inverter (1) have been detected.

6. The method as claimed in claim 1, characterized in that the respective switching elements ($T_1$-$T_6$) are only actuated for a short period of time in such a way that an electric machine (2) actuated by the inverter (1) does not generate any torque.

7. An apparatus for implementing the method as claimed in claim 1, characterized by a specially designed control device (6) which implements the method.

8. A computer program which implements all of the steps of a method as claimed in claim 1 when the program is running on a computer.

9. A computer program product comprising a program code stored on a non-transitory machine-readable storage medium for implementing the method as claimed in claim 1 when the program is executed on a computer.

10. The method as claimed in claim 1, wherein the multiphase inverter (1) is a three-phase inverter.

* * * * *